(12) United States Patent
Fontanot

(10) Patent No.: US 8,788,082 B2
(45) Date of Patent: Jul. 22, 2014

(54) METHOD AND A SYSTEM FOR EXECUTING A SCHEDULED PRODUCTION PROCESS

(75) Inventor: Paolo Fontanot, Monfalcone (IT)

(73) Assignee: Siemens Aktiengesellschaft, Munich (DE)

( * ) Notice: Subject to any disclaimer, the term of this patent is extended or adjusted under 35 U.S.C. 154(b) by 760 days.

(21) Appl. No.: 12/876,470

(22) Filed: Sep. 7, 2010

(65) Prior Publication Data

US 2011/0130856 A1 Jun. 2, 2011

(30) Foreign Application Priority Data

Nov. 27, 2009 (EP) ..................................... 09177380

(51) Int. Cl.
*G06F 19/00* (2011.01)
(52) U.S. Cl.
USPC ............................ 700/100; 700/101; 700/102
(58) Field of Classification Search
USPC .............................. 700/97, 99, 100–103, 106
See application file for complete search history.

(56) References Cited

U.S. PATENT DOCUMENTS

| | | | |
|---|---|---|---|
| 7,454,260 B2 | 11/2008 | Biegler et al. | |
| 2008/0154660 A1* | 6/2008 | Steinbach et al. | ................. 705/7 |

FOREIGN PATENT DOCUMENTS

EP 1 777 648 A1 4/2007

OTHER PUBLICATIONS

Extended European Patent Office Search Report, Dated May 26, 2010.
Goldman, Robert P., et al., "Constraint-Based Scheduler for Batch Manufacturing", Jan.-Feb. 1997, pp. 49-56.

* cited by examiner

*Primary Examiner* — Mohammad Ali
*Assistant Examiner* — Nathan Laughlin
(74) *Attorney, Agent, or Firm* — Laurence A. Greenberg; Werner H. Stemer; Ralph E. Locher

(57) ABSTRACT

A method and a system execute a scheduled production process having an execution duration within a production schedule executed by a manufacturing execution system. The method includes defining within the production process a resource required for the execution of the production process and defining for the resource a sequence-dependent setup sub-process having a setup duration, a productive sub-process and a sequence-dependent teardown sub-process. The production process is scheduled with a start-time. At a predetermined period at the start-time of the production process, the production process for dispatching and subsequent executing is confirmed. In response to the confirmation, individual production processes are created for the sequence-dependent setup sub-process, the production sub-process and the teardown sub-process. The created individual production processes are linked together by precedence constraints defining a sequence of the created individual production processes. The production schedule is rescheduled through replacing the production process by the created individual production processes.

10 Claims, 3 Drawing Sheets

METHOD AND A SYSTEM FOR EXECUTING A SCHEDULED PRODUCTION PROCESS

CROSS-REFERENCE TO RELATED APPLICATION

This application claims the priority, under 35 U.S.C. §119, of European application EP 09177380, filed Nov. 27, 2009; the prior application is herewith incorporated by reference in its entirety.

BACKGROUND OF THE INVENTION

Field of The Invention

The present invention relates to a method and a system for executing a scheduled production process having an execution duration within a production schedule executed and controlled by a manufacturing execution system (MEP).

Enterprise resource planning (ERP) is a system including hardware devices and corresponding software applications for planning business resources of an enterprise, i.e. material provisions, human resource managements, purchasing, orders, profits, finance, inventory controls, customer managements, etceteras, while the term "shop floor" has been used to indicate a system supporting the control of single machines involved in the manufacturing processes, for example by measuring the number of pieces produced per hour by each machine or the functioning parameters thereof, the quality of the pieces produced and so on.

Manufacturing execution systems (MES) are an intermediate layer providing computing machines and software tools between the ERP upper layer and the shop floor lower layer, including a software tool for production order management, which receives requests of production from the ERP, and a software tool for production modeling, which supports the phases of selecting and managing the resources to be involved in the manufacturing processes, i.e. employees, machines and materials, in order to realize a planned manufacturing process within required time constrains.

Therefore, manufacturing execution systems require modeling plant equipment for both scheduling and controlling activities. More particular, the manufacturing execution systems require reliable instruments to manage in complex production environments huge amounts of data coming from the shop or used to control the process at the shop floor level. Simultaneously, the software engineers operating the MES and/or the client need very often to amend the data structure in the relational database of the MES.

Therefore, the effective and profitable utilization of resources inside an industrial production environment in most cases requires a detailed planning of the resource usage required by the production processes. Resources in this regard may be for example machines, materials, personnel, tools and in general anything used for producing, transforming, transporting or packaging a product, material or assembly. The planning consists in deciding in advance on which resource each production process will be executed. During execution of the manufacturing operation the production processes may be executed on or with the resources as planned.

This usage can include for each resource and each production process several steps like setting up the resource, run some production operation on the resource, clean, shut-down or tear down the resource. When the resource used is a machine, the duration of the production step for a given product is usually determined by the machine itself because the duration is usually related to the throughput or to the production rate of the machine. In some cases however, the duration for the setup step is not only determined by the resource (machine) itself but also by preceding processes running on the machine. In this case the duration of the setup step is sequence-dependent and for a proper planning the exact sequence of processes run on a given machine shall be taken into account.

A certain sequence of processes may be assumed; usually scheduling software is used to perform such detailed planning and depending on this sequence the setup times for the resource are estimated by the production scheduler. For example when planning the operation of a paint-shop, the color of the product to be manufactured can be the discriminating criteria for determining the required sequence dependent setup durations. E.g. the painting machine does not need to be set-up if the preceding product has the same color (setup duration is equal to zero if the color does not change). But in case of a change of color, the duration of the setup may depend on the demanded current color and the previous color used. To switch from a red color to a yellow color can require a different amount of time than changing from a red color to a blue color. The scheduling software of the production scheduler therefore performs the computation of sequence-dependent setup durations according to some specific setup logic stored in a database of the production process model.

During production execution, the manufacturing execution system (MES) reads the detailed process plan from the database of the production scheduler and coordinates the resource utilization according to this plan. Process progress may be stored in this database, too, and may be reported back to the production scheduler. This feedback may influence the planning in cases when the progress of the production process is not in conformity with the schedule planned in advance. Due to this feedback, the scheduler can re-compute the resource utilization plan, including the estimated sequence-dependent setup-durations, in conformity with the actual situation resulting from the process execution. Usually, at a rather short time horizon prior to the scheduled time of execution, the sequence of processes should not change at all. However, for some technical reasons it is possible that the feedback from the process execution forwarding a process confirmation to the production scheduler is performed late, i.e. after actual execution of the production processes. It is also possible that the sequence in which the production processes are confirmed differs from the planned one. On the basis of this feedback the production scheduler normally automatically re-computes the estimated start and end time for at lease the following production process including the sequence-dependent setup durations.

The automatic re-scheduling of the sequence of production processes and of the sequence-dependent setup durations may be confusing for a production process planner. After each confirmation of a production process the setup duration may change which could also result in a changed sequence of production processes. For an effective shop floor control, the process planning needs to be reliable and predictable on a short term basis. Therefore, a need exists for the management of short term production planning in relation to the scheduling of setup and/or teardown activities.

Currently, the way known in the prior art solves this problem of short term changes on the production schedule in the short term planning of the production by the definition a "frozen period". During the frozen period the details of the production processes and resources to be used is left untouched by the production scheduler. Each change to the schedule in this frozen part of the process plan needs the explicit authorization by the production process planner. Due to this explicitness, any confusion of the process planner against unsolicited changes in the short term part of the planning horizon is tremendously reduced. Moreover, avoiding these changes of the sequence of the production processes during this frozen period of the horizon of the next production process to be dispatched for execution leads to the benefit of leaving enough time to the shop floor activities to collect and prepare all the resources (including components, raw materials tools, people) required by each production processes. Any change to the frozen part of the schedule that is communicated rather closely or without any reaction buffer to the shop floor might have an utterly disruptive impact on the overall operations, including the risk of loosing time, resources and a possible danger of an at least partially present unfeasibility for some of the schedule production processes.

Another approach to solve this problem of sequence-dependent setup durations that could be changed in the short term plan as a consequence of a process confirmation is presented in U.S. Pat. No. 7,454,260. The solution disclosed herein proposes to turn off the sequence-dependent computation of setup durations in the short term schedule. In this case, a heuristic logic is used to define for each resource a time interval wherein the setup durations are held constant and thus are no longer sequence-dependent. By making the setup durations "artificially" sequence-independent in such short term horizon, the benefit of a more robust planning can be achieved. On the other hand, this solution is not enabled to react flexible if the sequence of processes is affected by delayed or out-of-sequence notifications of process confirmations on the process progress.

SUMMARY OF THE INVENTION

It is accordingly an object of the invention to provide a method and a system for executing a scheduled production process having an execution duration within a production schedule executed and controlled by a manufacturing execution system which overcome the above-mentioned disadvantages of the prior art methods and devices of this general type, which is able to managed even process disturbances on a short term basis thereby allowing to flexibly re-schedule sequence-dependent setup and/or teardown processes.

The objective is achieved according to the present invention by a method and a system for executing a scheduled production process having an execution duration within a production schedule executed and controlled by a manufacturing execution system. The method includes the steps of:
a) defining within the production process a resource required for the execution of the production process;
b) defining for the resource a sequence-dependent setup sub-process having a setup duration, a productive sub-process having a production duration and a sequence-dependent teardown sub-process having a teardown duration;
c) scheduling the production process for its execution with a start-time on a production schedule wherein the scheduled execution duration is the sum of the setup duration, the production duration and the teardown duration;
d) at a predetermined period prior to or at the start-time of the production process, confirming the production process for dispatching and subsequent executing;
e) in response to the confirmation of the production process for dispatching, creating individual production processes for the sequence-dependent setup sub-process, the production sub-process and the teardown sub-process, whereby the created individual production processes are linked together by precedence constraints defining a sequence of the created individual production processes;

f) re-scheduling the production schedule through replacing the production process by the created individual production processes; and
g) executing the re-scheduled production schedule by dispatching the created individual production in the scheduled sequence.

The inventive step therefore lies in the creation, at the moment of confirming a scheduled process for dispatching, of the sub-processes having the sequence-dependent setup duration and/or teardown duration which have been so far embedded within the original production process. This creation allows to re-schedule the original production process and to schedule the sub-processes individually which leads to an individual dispatching and execution in the course of the production plan. The advantage is that this measure provides a more detailed and fine-grained control not only for the scheduling but even for the execution of the productive and non-productive operations. Indeed, when considering that the setup sub-process and/or the teardown sub-process are non-productive operations, the sub-processes nevertheless require coordinating activities and resources, like materials, tools and personnel, at the shop floor level with the result of having a productive resource setup and/or teardown ready for the required production.

In order to manage even a setup sub-process that doesn't need to be scheduled due to a continuous operation of a resource for the next production process, a duration of 0 seconds is allowed to be assigned to the setup duration and/or to the teardown duration range. Therefore, the scheme of planning the production process can be maintained although a set-up sub-process and/or a teardown sub-process do not occur for a specific production.

In order to enable the system and the method to gradually react on the preceding production processes and/or on the following production processes, the setup duration and/or the teardown duration may be determined in dependency of the preceding production process and the subsequent production process respectively. For the determination, an optional field table can be generated which allows to determine the respective durations easily.

In order to improve the availability of resources at the shop floor level the method may further include the step of defining within the sub-processes the respective resource specific for each of the sub-processes and required for the execution of the sub-processes. When the respective sub-processes are dispatched for execution, the respective resources are designated and executed to make them available for the execution of this sub-process. Of course, since a variety of different sub-processes may exist due to the various possible setup and/or teardown operations, the resources may be advantageously allocated to the sub-processes are defined in dependency of the preceding production process and/or the subsequent production process.

Other features which are considered as characteristic for the invention are set forth in the appended claims.

Although the invention is illustrated and described herein as embodied in a method and a system for executing a scheduled production process, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE SEVERAL VIEWS OF THE DRAWING

DETAILED DESCRIPTION OF THE INVENTION

For the description of the present invention, it has to be emphasized that Microsoft®.NET Framework is the basic software "backbone" for a manufacturing execution system. The solution of Siemens for the MES is SIMATIC® IT. To explain in short words the background of SIMATIC® IT, the ISA-95 standard has to be mentioned. ISA-95 is increasingly accepted as the world standard for Manufacturing Execution Systems that customers can rely upon. SIMATIC® IT not only covers ISA-95 functionalities but also actually uses ISA-95 as a blueprint for its product architecture. Siemens Aktiengesellschaft, the owner of SIMATIC® IT, is an active member of the ISA-95 committee to contribute to its continuing development.

SIMATIC® IT itself is a collection of software components representing Siemens' proposition for manufacturing execution systems (MES). SIMATIC® IT is unique as represented by its entire architecture, designed using ISA-95 as an architectural blue print for the implementation. SIMATIC® IT Production Modeler enables the definition of the plant model and of all the standard operating procedures (in terms of rules) in a fully graphical environment. SIMATIC® IT Production scheduler enables the definition of a production schedule according to a planned production. SIMATIC® IT components physically execute the actions defined in these rules and schedules.

Figure 1:
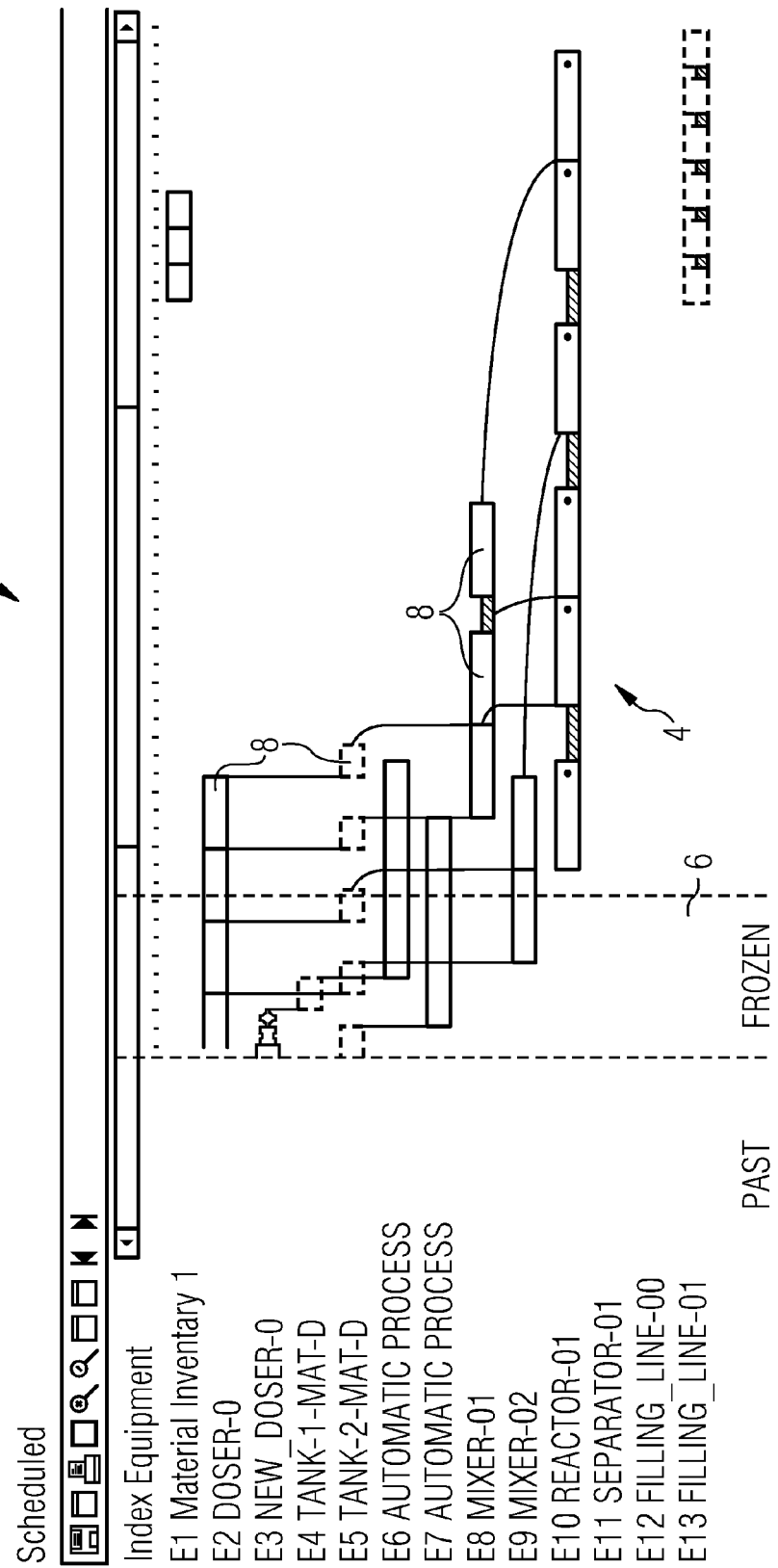
FIG. 1 is an illustration of a production schedule, represented as a Gantt chart with a frozen period according to the prior art.

FIG. 1 shows schematically a typical production schedule 2, represented as a Gantt chart 4 with a frozen period 6 according to the prior art. Various equipment E1 to E13 (resources) are scheduled for the execution of production processes 8 on the Gantt chart. The production processes 8 are represented by rectangular boxes using being displayed in a colored image. The boxes for production processes in the past are faded out. The frozen period 6 illustrates those production processes which will not be accessible to a re-schedule due to its short horizon for being dispatched for execution. Any disturbances in the production can not be reflected in the production schedule 2.

The way to overcome this problem of the changing setup durations and/or teardown durations in the short term planning is the feature of "consolidating" such durations as effective production processes, such as a setup process and/or a teardown process, that are linked to the respective productive sub-process of the production process. Therefore in FIG. 2, associated with a production process B are a setup sub-process and a teardown sub-process which are prior to the execution of the production process B represented by the hatched fields before and after the real productive process B.

A production scheduler computes the sequence of processes on the resources E1 to E13 as well as the estimated sequence-dependent values of the setup duration and/or teardown duration. The schedule 2 is forwarded to the execution module (instance) of a manufacturing execution system that will coordinate the execution of the shop floor operations. Production processes that are scheduled near to the actual time (in the short term schedule) are ready for being dispatched for execution. The idea of "consolidating" the setup and teardown durations is that, at the moment of confirming for dispatch a scheduled production process, separate processes are created (see FIG. 3). In the present example, the productive process B is surrounded by a setup process 10 and a teardown process 12. Such separate sub-processes 10, 12 are linked together by a precedence constraint. In this case, the links command process B to start after the setup process 10 has ended. The teardown process 12 starts not earlier than the production process B has ended. Both sub-processes 10 and 12 are now visible and continue to be visible to the scheduler but are now also subject to the dispatch list of processes to be executed at the shop level with all the implications of allocating resources in order to fulfill the production process.

The manufacturing execution system will execute each production process (setup-process, productive process, teardown process) as usual, taking into account the dependencies stated by the links (e.g. start production after end of setup). This measure will ensure the correct execution in the correct sequence as planned. In case of disturbances resulting in delayed process confirmations some link could be violated as result of the disturbance. The production scheduler can respond by signaling a warning for this violation but this warning can be used or not to trigger the computation of a new scheduled sequence. Transient disturbances will produce in this sense just transient warnings. The reason for doing so is that the re-scheduling shall not be done earlier until violations have been confirmed by further checks at shop floor level. This strategy keeps the number of schedule adjustments required by each production process confirmation to a minimum, thereby in particular minimizing the problems mentioned with relation to the prior art.

Figure 4:
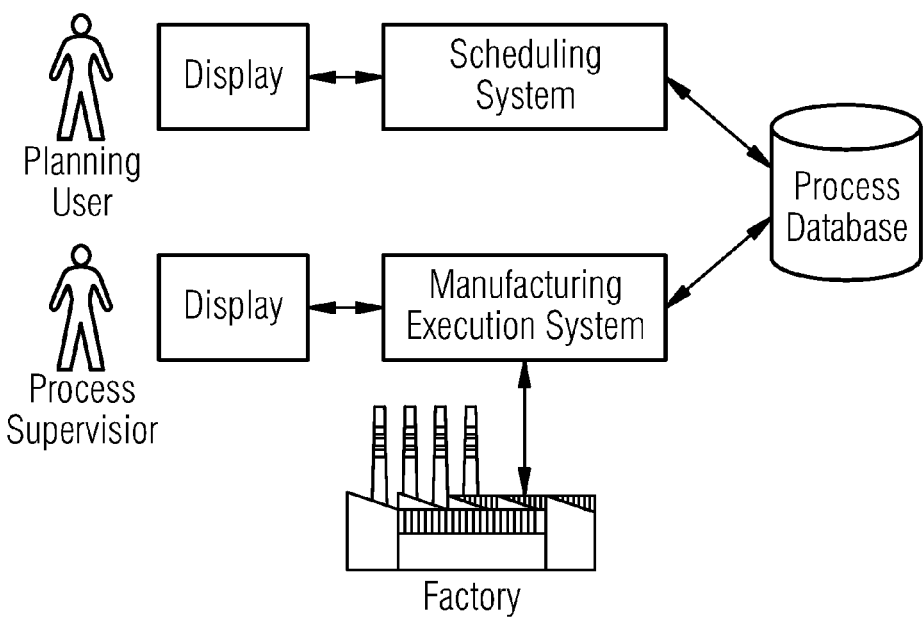
FIG. 4 is an illustration showing an embodiment of a solution containing a scheduling system, an execution system and a production database.

FIG. 4 shows a typical embodiment of this solution containing a scheduling system and an execution system that share information about the production processes by means of a production database storing the scheduled processes sequence and the actual process confirmations from the shop floor.

Figure 2:
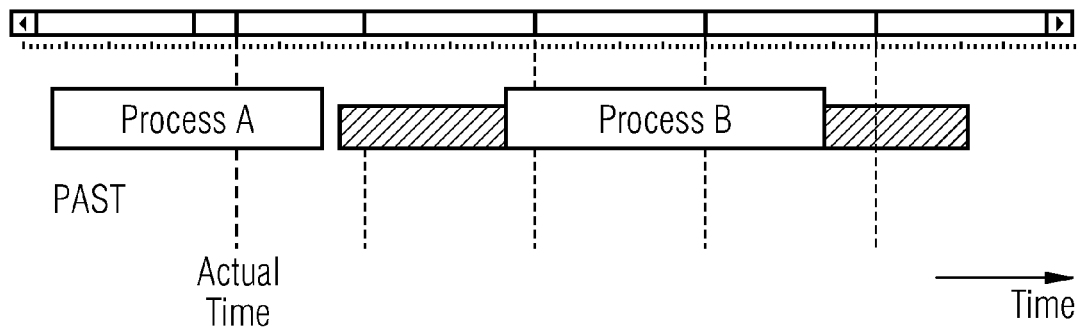
FIG. 2 is an illustration showing an example of a production schedule for processes A and B, represented as a Gantt chart.

Again, it has to be emphasized that during the scheduling the most common approach is embed setup duration and/or teardown duration in the production processes that are sequenced on the resources as shown in FIG. 2. Unfortunately, this is only a simplified model of the reality that could be good enough to lower the complexity and the level of detail of the overall schedule when considering that the scheduling horizon can be days, weeks or months involving a huge number of production processes to be sequenced. But on the short term horizon, an increased level of detail is recommended to gain a fine-grain control over the production processes actually dispatched and executed. This measure will also simplify the task of collecting data on process confirmations during the actual execution of the shop floor operations (with all its implications, like personnel, tools and materials to be held in readiness and used). Consolidating the setup routine and/or the teardown routine as real production processes dispatched and executed (even they are not productive at all) and rescheduling these processes gives an improved control, stability and less possible occasions of confusing feedback to the production planner. For example, if a process confirmation occurs late, and out of the planned sequence, the non-productive setup process and the productive process can be maintained as scheduled and just a warning on a probable violation of the link between these two production processes (setup process and productive process) notifies the production planner. But the setup duration and the process sequence can be left unchanged until this warning has been certified and confirmed. Many disruptions can have only a transient nature and can be resolved later when more data from the shop floor is available. Only in cases where the warning is confirmed, the setup process can be invalidated and new setup duration recomputed eventually changing the process sequence. In any case, this approach keeps an effective number of schedule changes at a minimum, taking in account only those changes really necessary in view of the productivity of the shop floor installation.

Figure 5:
FIG. 5 is an illustration showing the steps of the present inventive method for executing a scheduled production process having an execution duration within a production schedule executed and controlled by a manufacturing execution system.

Therefore, the substantial steps according to the present invention are as follows (see FIG. 5):

STEP 1: In the method for executing a scheduled production process having an execution duration within a production schedule executed and controlled by a manufacturing execution system, it is required to define within the production process a resource required for the execution of the production process. This task has to be done by either the production modeler or the production planner. This definition links the resources required to fulfill the production process to the production process (also in the sense of keep a respective record on the production database).

STEP 2: Then, it is necessary to define for the resource a sequence-dependent setup sub-process having a setup duration, a productive sub-process having a production duration and a sequence-dependent teardown sub-process having a teardown duration whereby a different set of data can exist in dependency on the preceding and/or following production processes. It has to be noted that the setup duration and/or the teardown duration can be set to zero in case that a setup process and/or a teardown are not required in the present production process environment.

STEP 3: In the following the production process is scheduled for its execution with a start-time on a production schedule wherein the execution duration is the sum of the setup duration, the production duration and the teardown duration which is for example also depicted in FIG. 2.

STEP 4: When it comes now closer to the execution of the scheduled production process, at a predetermined period prior to or at the start-time of the production process, the production process is confirmed for dispatching and subsequent execution.

Figure 3:
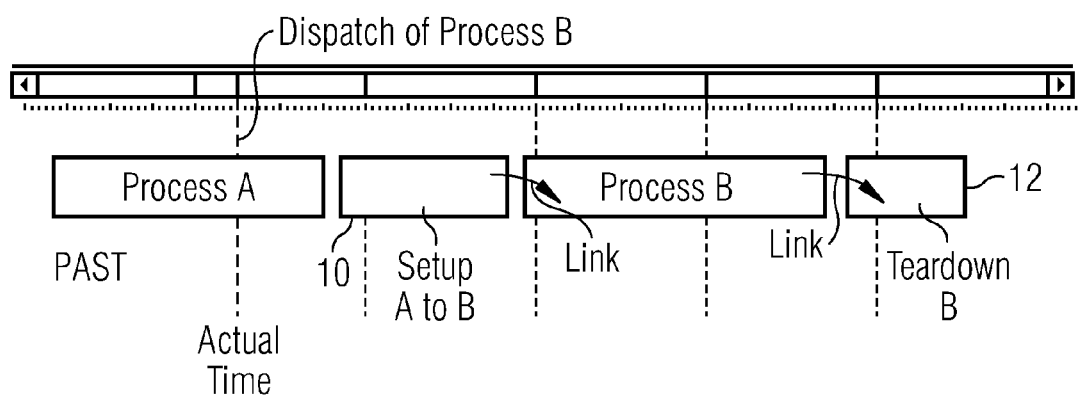
FIG. 3 is an illustration showing a consolidated example of a production schedule for the processes A and B with a setup sub-process.

STEP 5: Now the process of consolidating takes place wherein in response to the confirmation of the production process for dispatching, individual production processes are created for the sequence-dependent setup sub-process, the production sub-process and the teardown sub-process, whereby the created individual production processes are linked together by precedence constraints defining a sequence of the created individual production processes which is illustrated in FIG. 3.

STEP 6: When the individual production processes are created the production schedule is re-scheduled (re-computed) through replacing the original production process by the created individual production processes which is in result shown in FIG. 3. Thereby, the productive part of the production process (box labeled Process B) remains unchanged but is now surrounded by the created sub-processes for the setup and the teardown operations.

STEP 7: Finally, the re-scheduled production schedule is executed by dispatching the created individual production processes in the scheduled sequence.

The embodiment shown in FIG. 4 therefore represents a system for executing a scheduled production process having an execution duration within a production schedule executed and controlled by a manufacturing execution system. This system contains:

a) a production planner module to be used by a planning user enabled to define within the production process a resource required for the execution of the production process;

b) the production planner module further enabled to define for the resource a sequence-dependent setup sub-process having a setup duration, a productive sub-process having a production duration and a sequence-dependent teardown sub-process having a teardown duration;

c) a production scheduler module (scheduling system) enabled to schedule the production process for its execution with a start-time on a production schedule wherein the execution duration is the sum of the setup duration, the production duration and the teardown duration;

d) a production execution module enabled to confirm the production process for dispatching and subsequent executing at a predetermined period prior to or at the start-time of the production process;

e) the production planner module further enabled to create in response to the confirmation of the production process for dispatching individual production processes for the sequence-dependent setup sub-process, the production sub-process and the teardown sub-process, whereby the created individual production processes are linked together by precedence constraints defining a sequence of the created individual production processes;

f) the production scheduler module further enabled to re-schedule the production schedule through replacing the production process by the created individual production processes; and g) the production execution module further enabled to execute the re-scheduled production schedule by dispatching the created individual production processes in the scheduled sequence.

Although the scheduling system in FIG. 4 has a separate box apart of the box for the manufacturing execution system (MES), the scheduling system forms a vivid part of an MES, as for example realized in that manner in the SIMATIC® IT software.

The invention claimed is:

1. A method for executing a scheduled production process having an execution duration within a production schedule executed and controlled by a manufacturing execution system, which comprises the steps of:

defining within the scheduled production process a resource required for an execution of the scheduled production process;

defining for the resource a sequence-dependent setup sub-process having a setup duration, a productive sub-process having a production duration and a sequence-dependent teardown sub-process having a teardown duration;

scheduling the scheduled production process for its execution with a start-time on the production schedule wherein an execution duration is a sum of the setup duration, the production duration and the teardown duration;

confirming the scheduled production process for dispatching and subsequent executing at a predetermined period one of prior to the scheduled production process and at the start-time of the scheduled production process;

in response to a confirmation of the schedule production process for dispatching, creating individual production processes for the sequence-dependent setup sub-process, the production sub-process and the teardown sub-process, whereby the individual production processes created are linked together by precedence constraints defining a sequence of the individual production processes created;

re-scheduling a production schedule through replacing the scheduled production process by the individual production processes created; and executing a re-scheduled production schedule by dispatching the individual production processes created in the scheduled sequence.

2. The method according to claim 1, wherein a duration of 0 seconds is allowed to be assigned to at least one of a setup duration range and a teardown duration range.

3. The method according to claim 1, which further comprises determining at least one of the setup duration and the teardown duration in dependency of a preceding production process and a subsequent production process respectively.

4. The method according to claim 1, which further comprises defining within the sub-processes respective resource specific for each of the sub-processes and required for the execution of the sub-processes.

5. The method according to claim 4, which further comprises defining the resources allocated to the sub-processes in dependency of at least one of a preceding production process and a subsequent production process.

6. A system for executing a scheduled production process having an execution duration within a production schedule executed and controlled by a manufacturing execution system, the system comprising:

a production planner module enabled to define within the scheduled production process a resource required for an execution of the scheduled production process;

said production planner module further enabled to define for the resource a sequence-dependent setup sub-process having a setup duration, a productive sub-process having a production duration and a sequence-dependent teardown sub-process having a teardown duration;

a production scheduler module enabled to schedule the scheduled production process for its execution with a start-time on a production schedule wherein the execution duration is a sum of the setup duration, the production duration and the teardown duration;

a production execution module enabled to confirm the scheduled production process for dispatching and subsequent executing at a predetermined period one of prior to the scheduled production process and at the start-time of the scheduled production process;

said production planner module further enabled to create in response to a confirmation of the scheduled production process for dispatching, individual production processes for the sequence-dependent setup sub-process, the production sub-process and the teardown sub-process, whereby created individual production processes are linked together by precedence constraints defining a sequence of the created individual production processes;

said production scheduler module further enabled to re-schedule a production schedule through replacing the scheduled production process by the created individual production processes; and said production execution module further enabled to execute a re-scheduled production schedule by dispatching the created individual production processes in a scheduled sequence.

7. The system according to claim 6, wherein a duration of 0 seconds is allowed to be assigned to at least one of a setup duration range and a teardown duration range.

8. The system according to claim 6, wherein at least one of the setup duration and the teardown duration is determined in dependency of a preceding production process and a subsequent production process respectively.

9. The system according to claim 6, wherein said production planner module defines within the sub-processes a respective resource specific for each of the sub-processes and required for the execution of the sub-processes.

10. The system according to claim 9, wherein resources allocated to the sub-processes are defined in dependency of at least one of a preceding production process and a subsequent production process.

* * * * *